United States Patent [19]

Trudeau et al.

[11] Patent Number: 5,409,767
[45] Date of Patent: Apr. 25, 1995

[54] METHODS OF MAKING COMPOSITES USING SINGLE SIDED RESIN IMPREGNATED FABRIC PLIES

[75] Inventors: Allen E. Trudeau, Ansonia; Joseph D. Mogilewsky, Huntington, both of Conn.

[73] Assignee: United Technologies Corporation, Hartford, Conn.

[21] Appl. No.: 410,441

[22] Filed: Sep. 21, 1989

[51] Int. Cl.⁶ .................. B32B 27/04; B32C 43/34; B32C 70/46
[52] U.S. Cl. .................. 428/260; 264/101; 264/257; 264/313; 264/511; 264/571; 414/627; 414/737; 414/752; 425/126.1; 425/255; 425/388; 425/405.1; 428/284; 428/289; 428/290
[58] Field of Search ......... 264/510, 511, 512, 101, 264/102, 257, 258, 313, 119, 131, 571, 136, 137; 425/126.1, 406, 414, 389, 413, 405.1, 445, 388, 446, 254, 255; 156/281; 428/245, 254, 262, 289, 260, 290, 284; 414/627, 737, 752

[56] References Cited

U.S. PATENT DOCUMENTS

| | | | |
|---|---|---|---|
| 850,151 | 4/1907 | Goldman | 156/281 |
| 2,152,901 | 4/1939 | Manning | 264/DIG. 75 |
| 2,343,600 | 3/1944 | Weimann | 154/2 |
| 2,543,101 | 2/1951 | Francis, Jr. | 425/115 |
| 2,772,195 | 11/1956 | Gaarder | 55/524 |
| 2,797,179 | 6/1957 | Reynolds et al. | 264/296 |
| 2,833,685 | 5/1958 | Lawrence | 264/132 |
| 2,919,820 | 1/1960 | Brookhyser et al. | 414/627 |
| 2,978,376 | 4/1961 | Hulse | 264/510 |
| 3,004,295 | 10/1961 | Bottoms et al. | 264/510 |
| 3,043,738 | 7/1962 | Demeter et al. | 264/511 |
| 3,140,325 | 7/1964 | Graff | 264/510 |
| 3,276,928 | 10/1966 | Pearson et al. | 425/115 |
| 3,382,125 | 5/1968 | Lowdermilk, Jr. | 264/511 |
| 3,461,838 | 8/1969 | Nelson, Jr. et al. | 414/627 |
| 3,681,157 | 8/1972 | Snock | 425/115 |
| 3,825,642 | 7/1974 | Kies | 264/510 |
| 3,843,301 | 10/1974 | Hiiika et al. | 425/388 |
| 4,251,581 | 2/1981 | Schoppa et al. | 264/136 |
| 4,270,888 | 6/1981 | Kane et al. | 425/83.1 |
| 4,311,661 | 1/1982 | Palmer | 264/510 |
| 4,462,786 | 7/1984 | Perryman | 425/126.1 |
| 4,571,320 | 2/1986 | Walker | 264/40.1 |
| 4,576,560 | 3/1986 | Herman | 425/126.1 |
| 4,839,117 | 6/1989 | Swenson | 425/126.1 |
| 4,878,823 | 11/1989 | Blomquist | 425/126.1 |
| 4,973,241 | 11/1990 | Keyser | 425/116 |
| 4,994,224 | 2/1991 | Itoh et al. | 425/126.1 |
| 5,071,711 | 12/1991 | Heck et al. | 264/137 |
| 5,160,472 | 11/1992 | Zachiariades | 264/257 |

FOREIGN PATENT DOCUMENTS

| | | |
|---|---|---|
| 0111465 | 6/1984 | European Pat. Off. . |
| 44-25392 | 10/1969 | Japan ............. 264/DIG. 75 |
| 2113262 | 7/1983 | United Kingdom ...... 264/DIG. 75 |
| 2173144 | 10/1986 | United Kingdom . |

OTHER PUBLICATIONS

Modern Plastics International, vol. 16, No. 11, Nov. 1986, pp. 71–74, Lausanne, Switzerland; E. Schmelzer: "Automation For SMC Parts".

*Primary Examiner*—Jay H. Woo
*Assistant Examiner*—Duane S. Smith

[57] ABSTRACT

A process handling resin preimpregnated fabric plies that assures release of the plies from surfaces. The process includes applying pressure to a substantially dry side of a resin impregnated fabric ply with a surface, thereby facilitating release of the ply from the surface.

16 Claims, 2 Drawing Sheets

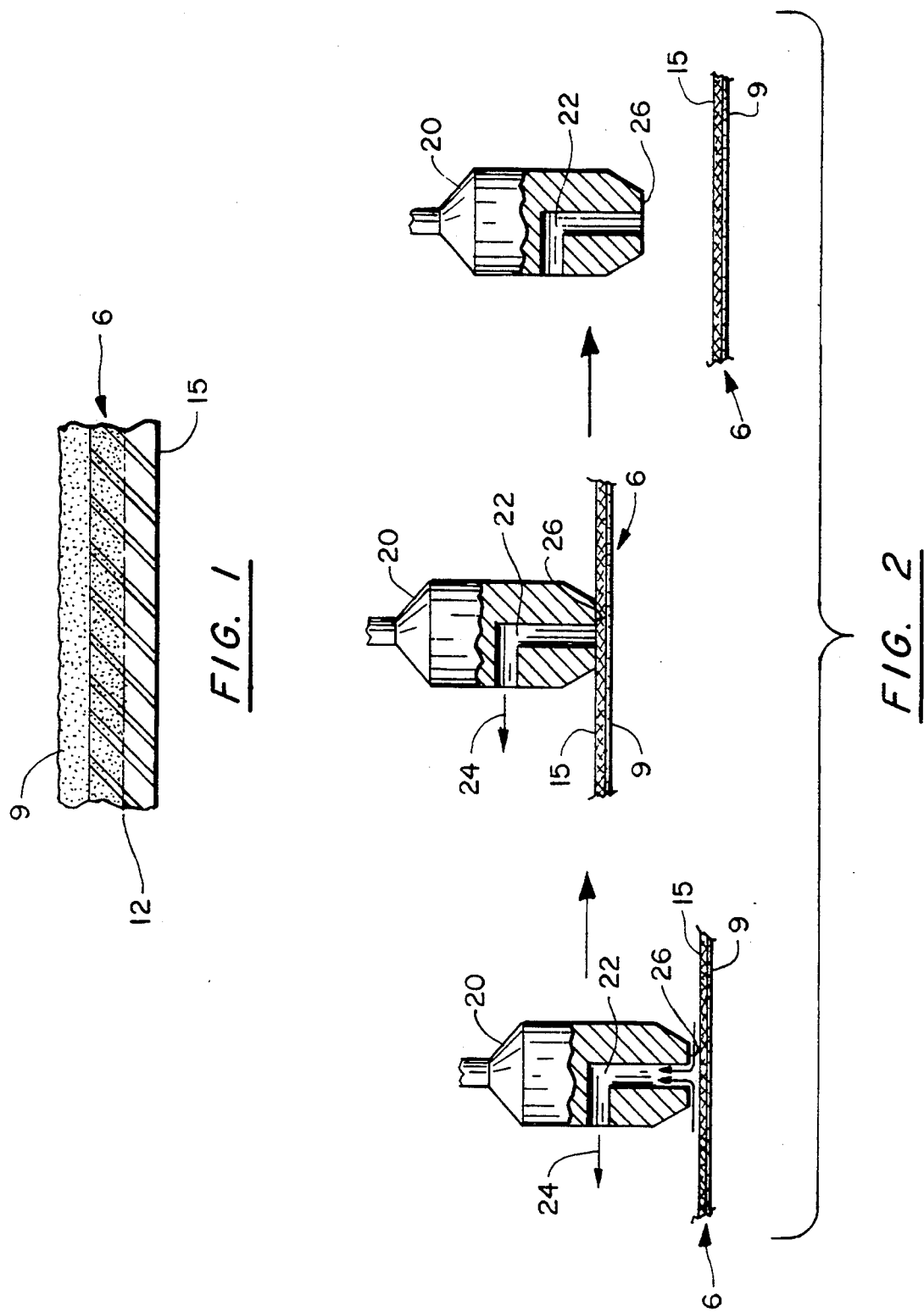

METHODS OF MAKING COMPOSITES USING SINGLE SIDED RESIN IMPREGNATED FABRIC PLIES

TECHNICAL FIELD

The field of art to which this invention is directed is methods of making fiber reinforced resin composites.

BACKGROUND ART

Composite articles are typically fabricated using a plurality of stacked preimpregnated fabric plies varying in size, shape and fiber matrix orientation. Typically, fabrication (prior to curing of the resin matrix) involves several independent process steps such as cutting individual plies to the desired shape, placing or stacking the plies in accordance with the desired fiber orientation, and forming each ply over a mold surface contour to ensure proper compaction of the plies during cure operations (i.e., without wrinkling, etc.).

Typically, these process steps are labor intensive. Generally, the ply is hand-placed into position, cut along a guide line to the desired shape, then removed from the top of the cutting apparatus (e.g. clicker die, gerber cutter, laser cutter). The precut ply is typically hand-carried to a mold station where the ply is laid up. At the mold station, the operator applies hand pressure to conform the ply to the mold surface contour tacking the ply to previously laid plies. Each ply normally includes a peel ply layer (plastic film) which is manually removed prior to stacking subsequent plies. The peel ply facilitates handling of the ply by protecting it from contamination and from sticking to handling equipment.

Recent efforts have focused on the automation of composite manufacturing. Progress has been made toward the development of automated cells for cutting, transfer and forming of preimpregnated plies to automate the lay-up operation.

For example, prepreg plies without the peel ply layer are transferred to a cutting head station where a numerically controlled head cuts the plies in a predetermined pattern. The cut plies are retrieved via a conveyor system and transferred to a mold surface by a robotic vacuum head. Once deposited, a flexible impervious membrane is used to shape the plies to a mold surface contour. The membrane is draped over the plies and sealed along its periphery to the mold. A vacuum is drawn in the cavity between the membrane and mold forcing the membrane to shape the plies to the mold surface contour.

Unfortunately in automated systems, the plies tend to stick to the cutting table, the conveyor belts, the vacuum head, flexible membrane, etc. due to the resin tack. A variety of techniques have been used to obviate this problem. For example, a vacuum apparatus may be used to separate the prepreg ply from the cutting table surface. However, the vacuum apparatus utilized is complex and subject to expensive breakdowns. In transfer equipment, positive pressure or extensible push pins have been utilized to release the prepreg plies from sticking to the vacuum heads. However, this has also proven complex.

The problem is exacerbated with automated forming equipment since the large surface area of a ply contacts the surface of a flexible membrane. One solution has been to heat the mold surface to increase the adhesion between the inner ply and the mold facilitating release of the prepreg from the flexible membrane. Other solutions have included applying a release agent to the ply to reduce tack. However, such substances can be a contaminant to the cured composite article.

Thus, although there has been a variety of solutions to the problem of handling tacky plies, none have proven satisfactory and there has been a continual search in this field of art for other solutions.

DISCLOSURE OF INVENTION

This invention is directed to a process of handling resin preimpregnated fabric plies that assures release of the plies from surfaces. The process comprises applying pressure to a substantially dry side of a resin impregnated fabric ply with a surface, facilitating release of the ply from the surface.

The foregoing and other features and advantages of the present invention will become more apparent from the following description and accompanying drawings.

BRIEF DESCRIPTION OF DRAWINGS

FIG. 1 illustrates a cross-section of the resin impregnated ply of this invention.

FIG. 2 illustrates a schematic of a transfer process of this invention.

BEST MODE FOR CARRYING OUT THE INVENTION

Figure 3:
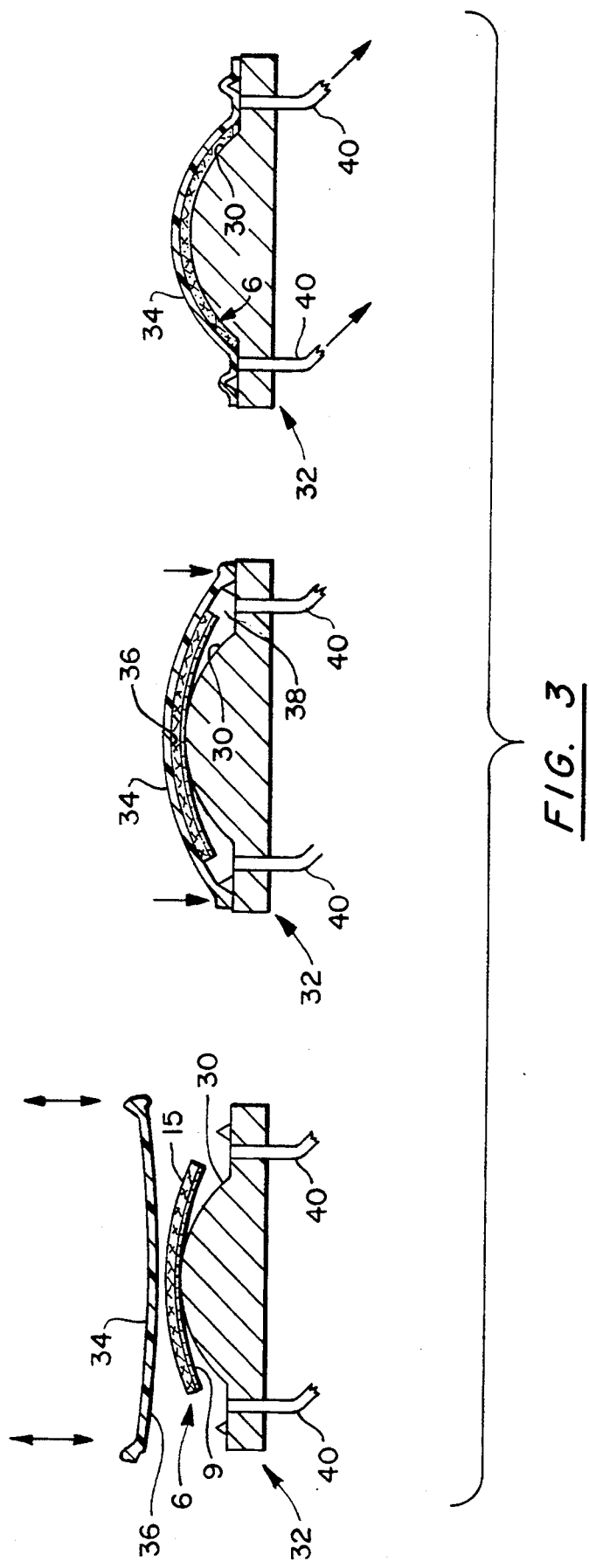
FIG. 3 illustrates a schematic of a forming process of the present invention.

The preimpregnated fabric ply (prepreg) of this invention is critical as it allows the reliable release from contacting (handling) surfaces of automated process equipment. According to FIG. 1, the ply 6 has resin 9 impregnated to a level 12 such that a substantially dry portion or side 15 remains. By substantially dry is meant that any resin contacted by the contacting surface which imposes a contact pressure on the preimpregnated fabric ply is insufficient to result in sticking. By contacting surface is meant any surface used for the manipulation, conveyance, imposition, or reaction of a contact pressure. By contact pressure is meant any pressure of a magnitude greater than the pressure that the weight a prepreg ply imposes on an area equal to that prepreg ply. Contact pressure applied on or to the ply may be either imposed or reacted by the contacting surface.

Preferably, the resin is impregnated on the wet side of the ply to a depth such that no resin is detectable on the dry side since this results in adherence to the automated processing equipment contacting surfaces. Preferably, the resin is impregnated to a depth that is about 20% to about 80% from the dry side because below 20%, the resin may bleed through to the dry side, and above about 80%, there may not be enough to hold the fabric together, i.e., without fraying or distortion, during automated processing. It is especially preferred that the resin is impregnated to a depth of about 40% to about 60% from the dry side. Any preimpregnated fabric ply that is substantially dry on one side may be used. Preferably, the ply, although substantially dry on one side has the same properties such as drape, flow and wetting to conventional prepreg plies (preimpregnated on both sides). In addition, preferably, the mechanical properties, resin content and weight are similar to conventional prepreg plies.

Although one side of the ply is dry, at least a substantially similar quantity of resin to that employed in conventional impregnated plies is impregnated. Thus, additional resin is impregnated on the wet side of the ply to assure thorough wetting of the ply during cure operations. For example, if the ply is impregnated to a depth of 50%, preferably, an additional 50% is deposited on the same side (wet side) of the ply to ensure proper wetting.

Conventional high strength fibers such as graphite, polyaramid fiber, glass fiber, boron, nylon, quartz, etc. are useful as the reinforcing fibers in the present invention. Conventional resins useful as composite matrices may be used in this invention. Examples include epoxies, polyesters, phenolics, and polyimides.

Impregnated fabric ply samples were made by Ciba-Geigy of Anaheim, Calif. using a typical hot melt technique. In the hot melt technique, a film of resin is initially cast at uniform thickness onto a carrier material (e.g., plastic sheet). The film is then heated and pressed into the fabric from both sides to yield the desired uniform impregnation. The fabric ply was fabricated by impregnating from only one side with a film of double thickness and pressing the film only partially through the fabric. Any vendor of preimpregnated fabric such as Ciba-Geigy Composite Materials of Anaheim, Calif., BASF Narmco also of Anaheim, Calif. and American Cyanamid Company of Havre DeGrace, Maryland are producers capable of supplying the fabric of the present invention.

A clear understanding of the process of the invention may be had by reference to FIGS. 2 and 3. In vacuum head 20 vacuum source 24 is in fluid communication with a contacting surface 26 through duct 22. The contacting surface 26 is held adjacent the dry side 15 of the ply 6 and a vacuum is drawn so that a negative pressure is established between the dry side 15 and the handling surface 26 imposing a contact pressure on the ply 6. The vacuum is subsequently terminated thus releasing the ply from the handling surface (e.g. vacuum head).

In FIG. 3, ply(s) 6 has been deposited on mold surface 30 of an automated vacuum forming apparatus 32 with the dry side 15 facing away from the mold surface 30. A flexible impervious membrane 34 having a contacting surface 36 is placed over the prepreg/mold surface and sealed along its periphery to the mold surface 30 thereby forming a sealed cavity 38. The cavity 38 is in fluid communication with vacuum ports 40. The cavity 38 is evacuated forcing the flexible membrane 34 against the prepreg 6. Since the contacting surface 36 contacts the dry side of the ply 6, the surface 36 releases freely from the layup and is ready for accepting another ply(s).

The shaped prepreg plies are then exposed to elevated temperatures and/or pressures sufficient to fully cure the applicable resin. Typically, these temperatures and pressures are about 350° F. to about 475° F. and about 60 psi to about 100 psi. It may be desirable to employ higher pressures during cure operations than those used conventionally, to assure full wetting of the entire prepreg to abate porosity and improve composite quality.

The invention is particularly applicable to automated processing equipment having contacting surfaces which repeatedly impose or react contact pressure on preimpregnated plies. Thus, the invention facilitates automated composite processes that are reliable, require less operator oversight yet produce quality composite articles. Hence, this invention makes a significant contribution to the field of automated composite processes.

Although this invention has been shown and described with respect to detailed embodiments thereof, it will be understood by those skilled in the art that various changes in form and detail thereof may be made without departing from the spirit and scope of the claimed invention.

We claim:

1. In a process for handling a resin preimpregnated fabric ply including applying contact pressure to a side of said ply with a contacting surface and releasing said ply, the improvement comprising:
   the ply having two sides, a resin impregnated side and a substantially dry side; and
   contacting the dry ply side with said contacting surface during the pressure application.

2. The process as recited in claim 1 wherein said contacting surface is in fluid communication with a vacuum source and said process further comprises the steps of initiating a vacuum for creating said contact pressure between said dry ply side and said contacting surface, moving said contacting surface to a desired destination and terminating said vacuum thus releasing said ply from said contacting surface.

3. The process as recited in claim 2 wherein said ply has resin impregnated to a depth such that resin is absent from said dry ply side.

4. The process as recited in claim 2 wherein said ply has resin impregnated to a depth about 20% to about 80% from said dry side.

5. The process as recited in claim 2 wherein said ply has an amount of resin impregnated on said resin impregnated side sufficient to fully impregnate said ply during a cure operation.

6. The process as recited in claim 1 wherein said contacting surface is a flexible impervious membrane and said process comprises the steps of
   (a) placing said ply over a mold surface contour said dry side facing away from said mold surface contour; with
   (b) disposing said flexible impervious membrane over said prepreg material;
   (c) sealing said flexible impervious membrane along its periphery to said mold thereby forming a sealed cavity; and
   (d) evacuating said sealed cavity thereby applying contact pressure between said dry fabric side and said flexible membrane to conform said ply to the shape of said mold contour.

7. The process as recited in claim 6 wherein said contact pressure between said dry ply side and said contacting surface is sufficient to conform said dry ply and said flexible impervious membrane to said mold contours.

8. The process as recited in claim 6 wherein said ply has resin impregnated to a depth such that resin is absent from said dry side.

9. The process as recited in claim 6 wherein said ply has resin impregnated to a depth about 20% to about 80% from said dry side.

10. The process as recited in claim 6 wherein said ply has an amount of resin impregnated on said resin impregnated side sufficient to fully impregnate said ply during a cure operation.

11. The process as recited in claim 1 wherein said ply has an amount of resin impregnated on said resin impregnated side sufficient to fully impregnate said material during a cure operation.

12. The process as recited in claim 1 wherein said contacting surface is in fluid communication with a vacuum source and said process further comprises the steps of initiating a vacuum for creating said contact pressure between said dry ply side and said contacting surface, holding said ply rigid against said contacting surface, cutting said ply in a predetermined pattern via an overhead cutter and terminating said vacuum thus releasing said ply from said contacting surface.

13. An impregnated fiber ply for use in making a composite via a cure operation comprising:
said ply having two sides, a resin film impregnated side and a substantially dry side, and wherein the amount of resin film on said resin film impregnated side is sufficient to fully impregnate said ply during the cure operation.

14. The impregnated fiber ply of claim 13 wherein said resin film is impregnated in said ply to a depth about 20% to about 80% from said dry side.

15. The impregnated fiber ply of claim 14 wherein said resin film is impregnated in said ply to a depth about 40% to about 60% from said dry side.

16. A completed impregnated fiber ply for use directly in making a composite via a cure operation comprising:
said completed ply having two sides, a resin film impregnated side and a substantially dry side, and wherein the amount of resin film on said resin film impregnated side is sufficient to fully impregnate said ply during the cure operation.

* * * * *